Oct. 29, 1963        V. E. PETERSON        3,108,636
METHOD AND APPARATUS FOR FRACTURING UNDERGROUND EARTH FORMATIONS
Filed May 1, 1961
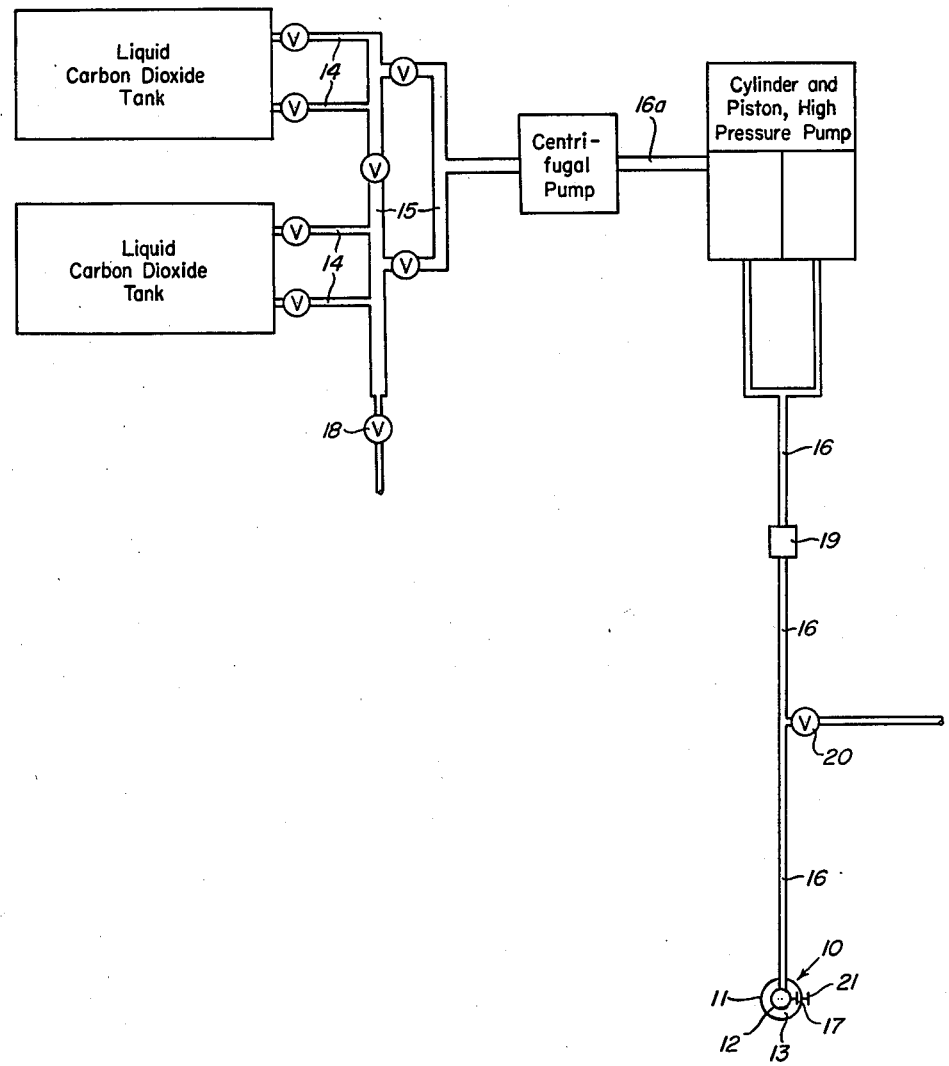
*INVENTOR.*
VICTOR E. PETERSON
BY
ATTORNEYS

United States Patent Office 3,108,636
Patented Oct. 29, 1963

3,108,636
METHOD AND APPARATUS FOR FRACTURING UNDERGROUND EARTH FORMATIONS
Victor E. Peterson, Salt Lake City, Utah, assignor to Pacific Natural Gas Exploration Company, Los Angeles, Calif., a corporation of California
Filed May 1, 1961, Ser. No. 106,708
10 Claims. (Cl. 166—42)

This invention relates to the treatment of wells for fracturing surrounding earth formations to increase productivity by increasing lateral drainage channels within a given reservoir.

In many areas where oil and gas are produced, it is found that reservoirs tapped by wells possess only a limited deliverability and that some means of increasing permeability of the producing formation is required to make the wells economical. Among the processes used is hydraulic fracturing. This involves the pumping of a liquid into the hole at a sufficiently high injection rate to create pressures in the producing formation capable of fracturing rock or of enlarging existing fractures to an extent such that drainage from the formation into the well can take place. This process has met with considerable success in many oil and gas producing areas.

The liquid used in applications of this hydraulic fracturing process heretofore has been either an oil or water, to which one or more reagents have been added to increase effectiveness. The process is known commercially under several proprietary names, among which are "Hydrafrac," "Sand-Frac," and "Water Sand-Frac." United States Patent No. 2,645,291 discloses one such process.

In order for the hydraulic fracturing process to be successful, the treating liquid must be removed from the well. In many instances this is a difficult problem, which involves considerable time and expense. Energy to return the liquid to the well bore, through which it may be returned to the surface, must be supplied by the reservoir. In cases where relatively low bottom hole pressures exist, or where only limited natural permeability is present, removal of the treating liquid is difficult and the process meets with only partial success.

To eliminate this problem, the process of the present invention employs a liquified gas, preferably liquified carbon dioxide, as the hydraulic fracturing liquid. Except for use—during the injection phase of the process—of high pressure equipment of the type ordinarily employed in the handling of liquified gases, such liquids are used exactly like any other liquid conventionally employed in a process of the type concerned. Thus, the liquified gas is merely pumped into the hole at a sufficiently high injection rate to create pressures within the formation which effectively fracture the rock or open previously existing fractures. Unlike water or oil, however, the temperature of the liquid through the injection stage is critical, it being absolutely necessary to keep the liquified gas at a temperature below its critical temperature, e.g. 88° F. in the case of carbon dioxide. This is accomplished in the usual manner, i.e. by transport and storage in either insulated or refrigerated tanks.

Taking liquid carbon dioxide for example, above 88° F. it becomes a gas and cannot be returned to the liquid state at any pressure. This characteristic of carbon dioxide is the basis of its advantage over conventional fracturing liquids.

Since most reservoir temperatures are in excess of 88° F., the liquid carbon dioxide is injected at a temperature low enough and at a rate rapid enough to remain liquid during the entire injection period despite the elevated temperature within the well. This is merely a matter of simple calculation based upon well temperature and depth in any given instance. The liquid carbon dioxide converts to the gaseous state soon after injection and returns to the surface in this form of its own accord, usually with some help from formation pressures. No residues are left within the formation or the reservoir to block either the natural or artificially created permeability.

While liquid carbon dioxide is ideal, in accordance with the invention other liquified gases having suitable critical temperatures may be employed. For example, liquid propane (204.08° F.), liquid n-butane (307.4° F.), liquid iso-butane (273.2° F.), liquid ethane (89.78° F.), and liquid ethylene (49.46° F.) are all readily available at oil refineries and could be utilized as fracturing agents in proper situations, depending largely upon the bottom temperature in the well concerned. However, these liquids are all highly inflammable. Liquid nitrous oxide (97.7° F.), liquid acetylene (96.8° F.) and many other liquified gases could also conceivably be utilized if economics and other considerations warranted. Liquid carbon dioxide is regarded as ideal because of its relatively low critical temperature (88° F.), and because it is non-inflammable, non-corrosive, non-poisonous, economical, and easily handled.

There is shown in the accompanying drawing a specific embodiment of apparatus representing what is presently regarded as the best mode of carrying out the invention.

In the drawing, the single FIGURE is a schematic representation of a complete system for hydraulically fracturing a well with liquid carbon dioxide.

Referring to the drawing:

The well 10, which may be considered to be either an oil or a gas well, is driven in conventional manner, with an outer casing 11 of steel pipe extending to the horizon to be treated and cemented in place to isolate the particular reservoir area concerned from adjacent formations, as is conventional in the use of hydraulic fracturing techniques. As is also conventional, an inner string 12 of injection pipe of smaller diameter is lowered into the outer casing, in concentric relationship therewith, to provide an annular space 13, which is preferably sealed off by a conventional packer (not shown) and kept filled with oil, in the case of an oil well, or with gas, in the case of a gas well. The liquid carbon dioxide is injected into the formation through the inner pipe string 12.

It is desirable to transport the liquid carbon dioxide to the well site in insulated and refrigerated tanks, indicated as such, suitably valved outlets 14 of which are then connected to a suitably valved manifold 15 of the injection system by means of flexible steel hoses or swing jointed piping to accommodate the great change in temperature involved.

The outlets 14 should be sufficiently large to provide for rapid discharge. Experience has indicated that the equivalent of two three-inch openings in each tank is required.

The temperature of the liquid carbon dioxide in the tanks should be maintained in the range of 0° to −20° F. The corresponding vapor pressures at these temperatures are 308.6 and 220.6 pounds per square inch absolute. Most favorable results are obtained if the fluid is kept in the lower range of this temperature interval.

The liquid carbon dioxide can be drawn from the tanks by utilizing the vapor pressures existing therewithin. These will be within the range noted above. Subject to temperature changes associaaed with the evaporation of small amounts of the liquid in the tanks, these pressures will be maintained in the tanks until all of the liquid is withdrawn.

High pressure, positive displacement, piston and cylinder pumps are normally used for injecting hydraulic fracturing liquids into the formations to be fractured. I have found, however, that the slight reduction in pressure which occurs on the intake side of such a pump is sufficient to create gas locks when pumping liquid carbon dioxide. While these may be overcome in various ways, a feature of the present invention is the provision of a centrifugal pump, indicated as such, in the injection line 16 in advance of the cylinder and piston, high pressure pump, indicated as such. This centrifugal pump increases the intake pressure of the high pressure pump a few pounds per square inch above the vapor pressure of the liquid carbon dioxide and alleviates the formation of gas and the resulting gas lock.

The injection line 16 leads into the upper end of the injection pipe string 12 at the well head through a valve 17, a back pressure valve 18 being interposed between the well head and the discharge from the high pressure pump. That portion 16a of such injection line which connects the centrifugal pump with the high pressure pump is desirably flexible.

Manifold 15 is equipped with a bleedoff line and valve 19 at a high point in the system, so that it can be filled with liquid before pumping is started and pressure can be bled from the system after the treatment is completed. Another bleedoff line and valve 20 leads from line 16 between valve 18 and the well head. A valve 21 is desirable at the well head to control passage into the annular space 13.

In applying the method of the invention to the well 10 by means of the apparatus illustrated, both valve 17 and valve 21 at the well head are closed. The tank discharge valves are then opened and liquid carbon dioxide bled into manifold 15 by cracking bleedoff valve 18. It will be known when the manifold is full of liquid by the kind of material ejected from the bleedoff line. Carbon dioxide "snow" will be ejected when the manifold is filled.

Bleedoff valve 20 on the down-stream side of the pumps is then cracked open to allow liquid carbon dioxide to bleed through the pumps and cool the system. If the pumps are equipped with bleedoff valves in the cylinder heads, these should be cracked open to be sure that the cylinders are full of liquid.

Next, the centrifugal pump is put into operation, and valve 17 at the well head is opened. At the same time, the high pressure pump is put into operation, slowly at first until liquid is moving smoothly, then to the capacity of the pump.

Pumping of the liquid carbon dioxide continues at a maximum rate. If the pressures obtained are very high, the strength of the pipe in the hole must be taken into consideration. As with conventional hydraulic fracturing methods, the pumping pressure usually increases rapidly in the first stages of the pumping operation and then drops rapidly after rupture in the reservoir occurs. Pumping is continued until the supply of liquid carbon dioxide is exhausted.

For economic reasons and to obtain the full use of the liquid carbon dioxide, it may be desirable to displace all of the liquid carbon dioxide out of the well into the reservoir. If this is done, displacement by either oil or liquid propane is carried out in any suitable manner immediately after the supply of liquid carbon dioxide in the tanks is exhausted. Liquid propane is handled by the system in the same manner as the liquid carbon dioxide, but if oil is used, it is not necessary to run it through the centrifugal pump.

On completion of the pumping phase of the treatment, valve 17 at the well head is closed and the surface equipment is disconnected.

The well is left in its closed condition from one hour to several hours, depending on the reservoir temperatures involved. The time is governed by an estimate of the time required for the liquid carbon dioxide to accumulate sufficient heat from the reservoir to pass 88° F. and be converted into a gas. Then the well is bled off by opening valves 17 and 20.

If a displacing fluid is used, this material flows out first, followed by carbon dioxide in a gaseous form. The carbon dioxide is ejected at a high rate and usually requires less than an hour to be essentially exhausted from the well. If the treatment is successful, the carbon dioxide is followed by either gas or oil. The nature of petroleum recovery from the well is dependent on the kind of petroleum involved, and the natural reservoir pressures in the section treated.

Since there is a relatively small margin of temperature (approximately 100° F.) between the tank temperatures and the critical temperature of liquid carbon dioxide, heat absorption from the well during the treating process is of great importance. Considerable heat must be absorbed from the conductor pipe and from the reservoir rock adjacent to the fractures. Allowance must also be made for the heat conducted from the rocks adjacent to the well bore. With normal injection rates, the heat from the pipe is sufficient to convert only a very small volume of the liquid carbon dioxide first pumped into the well into gas. Stable conditions for the liquid phase are obtained soon after pumping commences. At normal rates of injection, the heat conducted into the bore hole from adjacent rocks is not significant.

There is no feasible way to determine the temperatures obtained within the reservoir as a result of treating with liquid carbon dioxide, and such information is ascertainable only from a theoretical analysis. Thus, in the treatment of a gas well 8,700 feet deep, having a reservoir temperature of 244° F., a bottom hole thermometer survey indicated that the temperature of the liquid carbon dioxide entering the reservoir was 0° F. Its temperature at the well head was −15° F. This bottom hole temperature of the treating fluid fit closely the temperature that theoretically should have existed in the hole at the reservoir face. Since the heat conductivity of rock is very low, temperatures close to this should also have been present a considerable distance out into the fractures formed as the result of treating the gas reservoir in this well.

With holes having unusually high bottom temperatures, initial cooling of the injection pipe can be accomplished by commencing the treatment with liquid propane, which has a critical temperature of 204° F. In areas where it is difficult to obtain large quantities of liquid carbon dioxide, the use of liquid propane before and after the liquid carbon dioxide is advisable, and, as maintained earlier, liquid propane or any one of a number of other liquified gases may be employed in place of liquid carbon dioxide where conditions warrant.

A liquified gas and particularly liquid carbon dioxide has significant advantages over conventional hydraulic fracturing liquids in that no fluid block is formed next to the bore hole, cleanup after treatment usually requires only a few hours as contrasted with weeks or months thereby permitting successive treatment of multiple reservoir horizons in a single well at approximately 8 hour intervals, the well does not require a rig during or after treatment, the natural hydration of clays is not affected with consequent damage to the natural porosity and permeability of a sand reservoir.

In any given application of the process in practice, the rate of injection and the initial temperature of the liquid carbon dioxide must be determined in each instance by the depth and temperature of the well. It is a relatively simple matter for one acquainted with established thermodynamic principles to calculate the heat exchanges involved. All of the necessary information is available to the petroleum engineer from well completion data and from standard engineering books and tables. The following is given as a typical example:

The Well

Depth to top of reservoir _____ 5,000 feet
Size hole drilled _____ 9 inches
Size casing (20 pounds per foot) _____ 7 inches
Size tubing (6.40 pounds per foot) _____ 2½ inches The casing is cemented in the hole and is perforated opposite the reservoir. The injection pipe string or tubing is set on a packer at a depth of 4,990 feet, and the tubing and annulus between tubing and casing are filled with oil.

From the electric log or other source, the temperature of the reservoir is known to be 110° F. Surface ground temperature is known to be 60° F.

The Treatment

The treatment consists of 200 barrels of liquid carbon dioxide, all of which is pumped by displacement into the reservoir.

Tank temperature _____° F__ −20
Tank pressure _____p.s.i.a__ 220.6

Calculations

In this well, the quantity of heat conducted from the wall of the hole to the inside of the tubing per linear foot is expressed (see Faires "Thermodynamics," Macmillan—1957, p. 488) by the relationship:

$$q = \frac{t_d}{\sum \frac{\ln D_o/D_i}{6.28 z K}} \times \frac{1}{60}$$

where:
$q$ = quantity of heat in B.t.u.'s per foot per minute
$t_d$ = difference in temperature, degrees F.
$D_o$ = outside diameter
$D_i$ = inside diameter
$z$ = length in feet
$K$ = thermal conductivity B.t.u.'s per ft.² per foot per hour which, by solution becomes $$q = .0101 \, t_d$$

Converting temperature into terms of depth in the well, there is obtained the relationship $$T = .01D + 60$$

where:
$T$ = temperature in degrees F.
$D$ = depth in feet from surface

Converting $q$ into terms of depth, where $t_d$ at the surface = 80° F. (60° to −20°) and $t_d$ at 5,000 feet = 130° F. (110° to −20°), there is obtained $$q = .0001D + .808$$

from which, the total quantity of heat $Q$ in B.t.u.'s per minute conducted from the walls of the hole into the tubing becomes $$Q = \int_0^{5,000} .0001D(dD) + .808(dD)$$

and $$Q = 5,290 \text{ B.t.u.'s per minute}$$

The value of $Q$ represents the maximum rate at which heat can be conducted into the tubing.

Using the derived value of $Q$, it can be calculated that during the process of pumping, the liquid carbon dioxide would be heated in relation to the rate of pumping as follows:

| Pumping Rate [1] (bbls./minute) | B.t.u.'s absorbed per barrel | Resulting Temp. Increase, degrees F. | Expected Temp. Liquid at Reservoir, degrees F. |
|---|---|---|---|
| 4 | 1,371 | 9 | −11 |
| 5 | 1,097 | 7½ | −12 |
| 6 | 913 | 6 | −14½ |
| 7 | 784 | 5½ | −14½ |
| 8 | 685 | 5 | −15 |

[1] The rates of injection calculated are lower than those used for most hydraulic fracturing treatments.

The calculations given above have been made for a steady state. In addition to the heat conducted into the hole from the adjacent rock, it is clear that essentially all of the heat contained within the tubing must be equalized by absorption into the liquid carbon dioxide before a steady state condition can be reached. For this well, the quantity of heat contained in the tubing can be shown to be $$Q_t = .00345 D^2$$

from which $$Q_t = 86,250 \text{ B.t.u.'s from } -20° \text{ F.}$$

The heat contained in the tubing is equivalent to the heat contained in 3.1 bbls. of liquid carbon dioxide between −20° F. and the critical temperature of 88° F., and from the practical standpoint it is not significant to the success of the treatment. It can be calculated that it will require the pumping of approximately 10 bbls. of liquid carbon dioxide before the effect of the heat in the tubing is offset and the steady state conditions calculated above prevail.

In the initial stages of the injection of liquid carbon dioxide in this well, none of the fluid would be expected to convert into a gas before reaching the reservoir. It can be shown that as a result of displacing the oil from the tubing, the relatively cooler oil in the upper part of the tubing will cool the lower part of the tubing below the critical temperature of the liquid carbon dioxide.

It is obvious that, to maintain injection rates equal to those calculated, the pressures would at all times be in excess of the vapor pressure of the liquid carbon dioxide at the surface. In addition to the pump pressure, the hydrostatic pressure of the fluid column would be effective down the hole.

Thus, as calculated, at least 190 bbls. of liquid carbon dioxide having a temperature of less than 0° F. could be expected to enter the reservoir. Since there is no way of determining the geometry of the fractures formed as a result of the treatment, no calculations can be made as to the rate of heat absorption from the reservoir.

It is evident under the conditions calculated that approximately 4,670,000 B.t.u.'s must be absorbed by the liquid before being completely converted to gas. By prudent engineering judgment, it is clear that, in consideration of the low rate of heat conduction in rock, this heat absorption is slow enough to allow deep penetration of the fluid into the reservoir, allowing ample time to cause fracturing by the hydraulic pressures thereby created.

Although most natural, underground, petroleum reservoirs have temperatures in excess of 88° F., those which do not may still be treated with liquid carbon dioxide in accordance with the invention, and other highly volatile liquids may also be used, as previously mentioned, even though the reservoir temperature is lower than the critical temperature of the liquid. This is so because liquid carbon dioxide and such other highly volatile liquids will convert to the gaseous state at lower than their critical temperatures whenever the pressure is lowered below the vapor pressure for the particular temperature involved.

Thus, in a reservoir where the temperature does not exceed the critical temperature of the liquified gas utilized as the hydraulic fracturing agent, conversion after treatment can be caused to take place by lowering the pressure of the well below the vapor pressure. This is accomplished by removing the liquified gas or other liquid from the inner string of injection piping or tubing. In a well in which the liquified gas is not displaced from the tubing, opening the injection valve at the well head and the bleedoff valve in the injection line will produce the required reduction in pressure. In a well in which the liquified gas has been displaced from the injection piping or tubing by oil, it will necessary to swab the oil from such piping or tubing if there is insufficient pressure in the reservoir to cause the oil to flow out.

It will be realized that lowering the pressure of the well is an expedient that may be restored to in any case, if found desirable, to hasten conversion of the liquified gas from its liquid to its gaseous state. Nevertheless, it is better practice to allow the liquified gas to absorb heat from the formation, where possible, and expand to the fullest extent before conversion to the gaseous state, thereby promoting maximum penetration of the formation and maximum fracturing thereof by the liquid.

Under certain conditions it may be desirable to return the treating liquid to the bore hole before complete conversion to the gaseous state occurs. A rapid reduction of pressure in the bore hole immediately after the injection stage will produce this result. Such a rapid reduction of bore hole pressure is accomplished as described above, the injection valve being opened wide for the purpose. Should the injection piping or tubing be filled with oil, it is swabbed therefrom as soon as possible.

The present application constitutes a continuation-in-part of my copending, allowed application Serial No. 632,654, filed January 7, 1957, now abandoned.

Whereas there is here illustrated and described a certain preferred embodiment which I presently regard as the best mode of carrying out my invention, it should be understood that various changes may be made without departing from the inventive concepts particularly pointed out and distinctly claimed herebelow.

I claim:

1. A method of fracturing an underground earth formation whose temperature is at least 88° F. and into which a well has been driven, comprising pumping liquid carbon dioxide into said earth formation at sufficient rate and pressure to fracture it, the said liquid carbon dioxide thereafter changing to a gas upon the absorption of sufficient heat to raise its temperature to at least 88° F., whereby the usual scavenging operations are substantially eliminated.

2. A method of fracturing an underground earth formation into which a well has been driven, comprising pumping a highly volatile liquid into said earth formation at sufficient rate and pressure to fracture it, said liquid having a critical temperature which is lower than the temperature of said formation and being gaseous under atmospheric conditions; keeping said liquid in the formation until heat absorbed thereby volatilizes it to its gaseous form; and releasing the gas from the well, whereby the usual scavenging operations are substantially eliminated.

3. A method of fracturing an underground earth formation into which a well has been driven, comprising pumping a highly volatile liquid into said earth formation at sufficient rate and pressure to fracture it; releasing pressure of the well at the well head to volatilize said liquid following the fracturing operation; and removing the volatilized liquid from the well essentially by its own vapor pressure, whereby the usual scavenging operations are substantially eliminated.

4. The method of claim 3, wherein pressure at the well head is released suddenly and substantially fully, so that fracturing liquid returns as a liquid to the vicinity of the well from the interstices of the formation before volatilizing.

5. A method of fracturing an underground earth formation into which a well has been driven, comprising pumping liquid carbon dioxide into said earth formation at sufficient rate and pressure to fracture it; volatilizing the liquid carbon dioxide following the fracturing operation and while it is still in the well; and removing the volatilized carbon dioxide from the well essentially by its own vapor pressure, whereby the usual scavenging operations are substantially eliminated.

6. The method of claim 5, wherein the liquid carbon dioxide is volatilized by releasing pressure from the well at the well head.

7. A method of fracturing an underground earth formation whose temperature is at least 88° F. and into which a well has been driven, comprising pumping liquid carbon dioxide down said well and into said earth formation at sufficient rate and pressure to fracture it; and scavenging the well by permitting said liquid carbon dioxide to absorb sufficient heat to raise its temperature to at least 88° F.

8. The method of claim 7, wherein a displacement fluid is introduced into the well following the introduction of the liquid carbon dioxide, said displacement fluid as well as carbon dioxide being scavenged.

9. A method of fracturing an underground earth formation into which a well has been driven, comprising pumping liquid carbon dioxide into said earth formation at sufficient rate and pressure to fracture it; releasing pressure at the well head suddenly and substantially fully, so that fracturing liquid carbon dioxide returns as a liquid to the vicinity of the well from the interstices of the formation and is then volatized; and removing the volatized carbon dioxide from the well essentially by its own vapor pressure, whereby the usual scavenging operations are substantially eliminated.

10. A method of both fracturing and scavenging an underground earth formation whose temperature is at least 88° F. and into which a well has been driven, comprising introducing into said well, at sufficient rate and pressure to fracture it, a fracturing liquid comprising liquid carbon dioxide; and permitting said liquid carbon dioxide to absorb sufficient heat following said fracturing to raise its temperature to at least 88° F., whereby it becomes a gas and acts to scavenge the well.

References Cited in the file of this patent

UNITED STATES PATENTS

| | | |
|---|---|---|
| 2,772,737 | Bond | Dec. 4, 1956 |
| 2,869,643 | Schuessler et al. | Jan. 20, 1959 |
| 2,876,839 | Fast | Mar. 10, 1959 |
| 2,879,847 | Irwin | Mar. 31, 1959 |
| 2,884,067 | Marken | Apr. 28, 1959 |
| 2,955,654 | Stogner | Oct. 11, 1960 |
| 3,063,499 | Allen | Nov. 13, 1962 |